(12) United States Patent
McCullough et al.

(10) Patent No.: US 6,261,495 B1
(45) Date of Patent: Jul. 17, 2001

(54) PROCESS OF MOLDING A POLYMER REINFORCED WITH PARTICLES

(75) Inventors: Kevin A. McCullough, Warwick, RI (US); James D. Miller, Marietta, GA (US)

(73) Assignee: Chip Coolers, Inc., Warwick, RI (US)

( * ) Notice: Subject to any disclaimer, the term of this patent is extended or adjusted under 35 U.S.C. 154(b) by 0 days.

(21) Appl. No.: 09/375,581

(22) Filed: Aug. 17, 1999

(51) Int. Cl.$^7$ ................................................ B29C 45/46
(52) U.S. Cl. ..................... 264/108; 264/142; 264/323; 264/328.18
(58) Field of Search ................................. 264/108, 142, 264/323, 328.18

(56) References Cited

U.S. PATENT DOCUMENTS 6,030,203 2/2000 Kuroda .................................. 425/561

*Primary Examiner*—Leo B. Tentoni
(74) *Attorney, Agent, or Firm*—Barlow, Josephs & Holmes, Ltd.

(57) ABSTRACT

A plunger machine for molding reinforced polymer is provided. The plunger machine has particular application in molding polymer that is reinforced with particles having an aspect ratio greater than 1:1. The plunger machine includes a barrel housing with a smooth barrel bore that defines a main melt chamber. A plunger housing, having a plunger bore, defines an initial melt chamber that is in communication with the main melt chamber. A plunger resides in the plunger bore and is reciprocatable therein. The barrel bore is continuously inwardly to provide a smooth transition and alignment of reinforcing members in the polymer mixture during the melt process. The smooth bore ensures substantial alignment of the reinforcement members with the longitudinal axis of the bore to avoid excessive breakage of the reinforcing particles and prepare the polymer mixture for extrusion into a mold assembly.

6 Claims, 5 Drawing Sheets

PROCESS OF MOLDING A POLYMER REINFORCED WITH PARTICLES

BACKGROUND OF THE INVENTION

The present invention relates generally to an improved injection molding machine and method of using the machine to form parts. More specifically, the present invention relates to a plunger molding machine for reinforced polymer compositions, particularly, polymers loaded with thermally conductive media, such as carbon and aluminum in the form of fibers and flakes.

In the molding industry, it has been well known to injection mold plastics into various articles of commerce. In particular, it has become well known to load such plastics or polymer-based compositions with other media to form a reinforced polymer composition. Reinforcing a polymer composition with other media is done for many different purposes. For example, reinforced polymer may be employed to provide a thermally conductive plastic where the reinforcing media is highly thermally conductive, such as carbon fiber or aluminum flakes. Another example, is where the polymer is loaded with copper fiber to provide an electrically conductive polymer composition. Still further, aluminum flakes may be loaded in the polymer composition to provide a composition with EMI shielding. Also, glass, carbon or other fiber may be employed to add strength and/or stiffness.

In general, the loading of polymer, with a reinforcing media, raises many concerns as to the ability to successfully injection mold such a mixture because of the presence of the additional reinforcing media. For example, the loading of long carbon fiber into a polymer composition raises concerns as to strand and/or filament breakage during the melting and molding process. There is present the competing issues of the concern of thorough mixing of the loaded composition with the concern of excessive breakage of the delicate reinforcing media. Prior art molding machines typically create high turbulence and/or grinding of the polymer for the purposes of mixing the composition. These prior art machines commonly included a torpedo-shaped member or spreader to increase the level of turbulence to improve turbulence. However, such turbulence and grinding under pressure results in greatly reduced reinforcement media length.

However, these known processes are incompatible with the examples above, particularly the thermally conductive composition with carbon fiber, where it is critical that the breakage or damage to the reinforcing media be kept to a minimum to ensure that the desired properties of the composition are maintained. In the above example, if the lengths of the carbon fibers loaded within the polymer composition are ground up into much shorted lengths, it is clear that the overall thermal conductivity of the composition will be degraded as a result.

To address these problems, compression molding has been attempted where there is a manual lay-up of material and the reinforcing media thereon. As can be understood, such manual assembly is expensive and is far too slow for mass production. Thus, compression molding is inadequate and impractical for molding reinforced material and suffers from economic and geometry-related limitations.

In addition to the problems associated with the reduction of the length of reinforcing media, the alignment of such media is also a concern. In the examples above, a highly aligned and oriented loading of reinforcing media along the path of conductivity is preferred to obtain higher performance of the molded composition. For example, a highly oriented array of carbon fiber within a polymer base would yield higher thermal conductivities than a composition that included randomly oriented fibers because the number of transitions from carbon to polymer to carbon within the composition would be greatly reduced. Further, packing densities are higher when the fibers or filaments are well-aligned. The foregoing alignment and breakage problems become even more important where the aspect ratio of the reinforcing media becomes larger and larger.

In view of the foregoing, there is a demand for an improved injection molding machine and method that is well suited for accommodating polymer compositions loaded with reinforcing media having aspect ratios greater than 1:1. There is a demand for a molding machine that is capable of greatly decreasing the amount of breakage of reinforcing media during the molding process. There is also a demand for a molding machine and method of using the machine that can better align reinforcing media along the line of melt flow to provide a better oriented reinforced composition.

SUMMARY OF THE INVENTION

The present invention preserves the advantages of prior art molding machines and methods for molding reinforced plastic. In addition, it provides new advantages not found in currently known machines and methods and overcomes many disadvantages of such currently available machines and methods.

The invention is generally directed to the novel and unique molding machine and method of using the same to molding reinforced polymer into articles. The molding machine and method of using the machine of the present invention enables reinforced polymer to be molded with minimal damage to the reinforcing particles loaded in the polymer molding composition.

The plunger machine of the present invention has particular application in molding polymer that is reinforced with particles having an aspect ratio greater than 1:1. The plunger machine includes a barrel housing with a smooth barrel bore that defines a main melt chamber. A plunger housing, having a plunger bore, defines an initial melt chamber that is in communication with the main melt chamber. A plunger resides in the plunger bore and is reciprocatable therein. The barrel bore is continuously inwardly to provide a smooth transition and alignment of reinforcing members in the polymer mixture during the melt process. The smooth bore ensures substantial alignment of the reinforcement members with the longitudinal axis of the bore to avoid excessive breakage of the reinforcing particles and prepare the polymer mixture for extrusion into a mold assembly. Compression is minimized to avoid unwanted breakage of the reinforcement members which is deleterious to the integrity of the reinforcing media.

In accordance with the method of the present invention, a mixture of polymer, reinforcing particles, such as carbon fibers of an aspect ration greater than 1:1, are fed into a feed port with the assistance of an auger through a hopper. The mixture is gently fed into an initial melt chamber where the mixture is melt and then urged by a plunger into a main melt chamber. The walls of the main melt chamber are heated by heater bands, or the like, and gradually and inwardly tapered to gradually and gently melt the mixture and to gradually align the reinforcing particles with the polymer base without causing excessive breakage to the reinforcing particles. At the exit port of the main melt chamber, the reinforcing members are substantially aligned lengthwise along the direction of flow of the melt within the chamber so as to provide a highly oriented melt mixture for subsequent injection into a mold for an article. The surface area of the bore is minimized versus the volume of the bore to reduce friction within the bore.

It is therefore an object of the present invention to provide a molding machine and method of molding that is suitable for molding reinforced polymer compositions.

It is an object of the present invention to provide a molding machine and method of molding that can mold reinforced polymer compositions while substantially decreasing the amount of breakage of the reinforcing media.

It is a further object of the present invention to provide a molding machine that aligns reinforcing media in a polymer composition with the melt flow for optimal results during injection molding.

Another object of the present invention is to provide a molding machine that can directly injection feed a mold or produce highly oriented reinforced polymer pellets for later use in an injection molding process.

It is a further object of the present invention to provide an injection molding machine that minimizes friction, shear and length degradation of reinforcing media while optimizing mixing of the reinforcing media with the polymer base and the alignment of the media with the melt flow.

BRIEF DESCRIPTION OF THE DRAWINGS

The novel features which are characteristic of the present invention are set forth in the appended claims. However, the inventions preferred embodiments, together with further objects and attendant advantages, will be best understood by reference to the following detailed description taken in connection with the accompanying drawings in which:

DETAILED DESCRIPTION OF THE PREFERRED EMBODIMENT

In the present invention, molding machine 10 and corresponding method of using the machine 10 is suitable for accommodating a wide array of compositions of different materials loaded with reinforcing media of different types, such as in the form of fibers, flakes, ribbons and rice. For example, the present invention is suitable for a thermally conductive polymer composition loaded with carbon fibers as well as polymer composition loaded with aluminum flakes for EMI shielding applications. Further, an aluminum base may be loaded with steel flakes to enhance the physical tensile strength of the molded part. For simplicity and ease of illustration, the molding machine 10 and corresponding method will be described in detail below in connection with a thermally conductive composition with a polymer base loaded with carbon fiber. This is one example of the many applications of the machine 10 and method of the present invention where a base material is loaded with a reinforcing media that needs to be aligned but not broken during the molding process.

Figure 1:
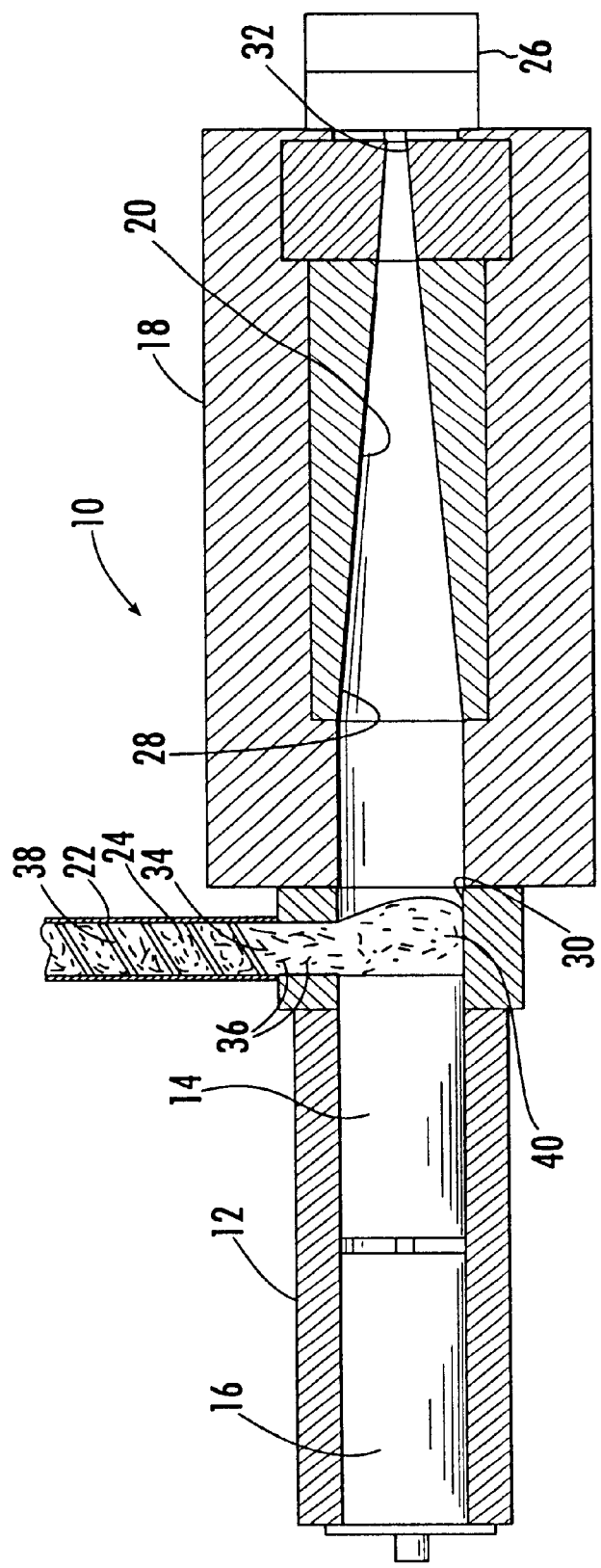
FIG. 1 is a cross-sectional view the preferred embodiment of the molding machine of the present invention illustrating the first step of injection molding a part in accordance with the present invention.
Figure 2:
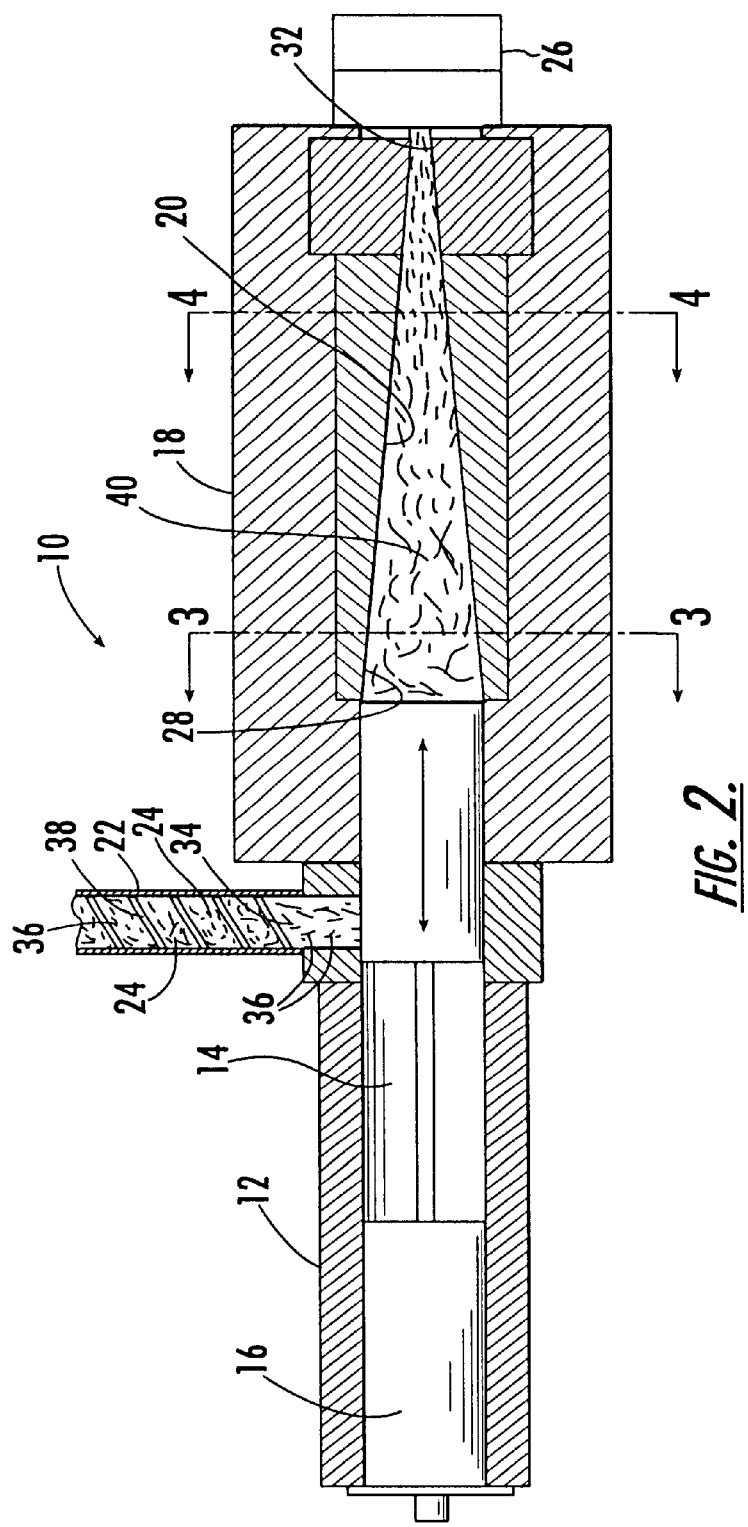
FIG. 2 is cross-sectional view the preferred embodiment of the molding machine of the present invention illustrating the step of packing the main melt chamber in accordance with the present invention.

Referring both to FIGS. 1 and 2, cross-sectional views of the plunger molding machine 10 of the present invention is shown. A plunger housing 12 contains a plunger or piston 14 therein. The plunger 14 reciprocates between retracted position, as shown in FIG. 1, and a forward position, as shown in FIG. 2, with the assistance of a hydraulic pump 16 or other similar reciprocating apparatus. The plunger housing 12 is mated with a barrel housing 18 that defines a barrel bore 20 therein. The bore 20 is configured in accordance with the present invention. In addition, a feed port 22 is provided which communicates with the plunger housing 12 and supplies the dry polymer mixture 24 to the molding machine 10 for melting and subsequent extrusion either into a cavity in a mold assembly 26 to form a molded part or cut into pellets for later use. Details of the molding process in accordance with the present invention will be described in detail below.

Figure 3:
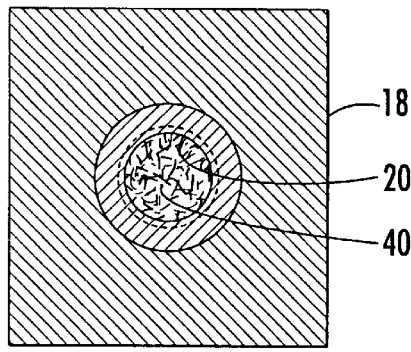
FIG. 3 is a cross-sectional view through the line 3—3 of FIG. 2.
Figure 4:
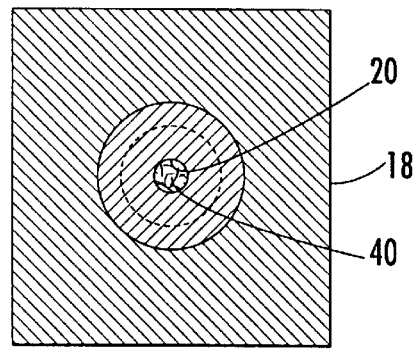
FIG. 4 is a cross-sectional view through the line 4—4 of FIG. 2.

Still referring to FIGS. 1 and 2, the construction of the bore 20 of the molding machine 10 of the present invention is shown. The inner construction of the barrel housing 18 is dimensioned to provide a substantially tapered bore 20 where the entry port 28 of the bore 20 is substantially equal to the dimension of the exit of the plunger housing 12. Preferably, a first portion of the bore 20 of the barrel housing 18 is, essentially, identical to the dimension of the bore 30 of the plunger housing 12 so as to receive the reciprocating plunger 14 therein. The bore 20 gradually tapers inwardly from a diameter of, for example, approximately 2.0 inches to an exit port nozzle end 32 of, for example, approximately 0.25 inches and extends, for example, to a length of approximately 12.0 inches. The stroke length of the plunger 14 is, for example, approximately 7.0 inches. FIGS. 3 and 4, cross-sectional views through the line 3—3 and 4—4, respectively, further illustrate the inward taper of the bore 20 of the molding machine 10 of the preferred embodiment of the present invention. FIG. 3 shows the an inner diameter of the bore 20 proximal to the entry port 28 of the bore 20 while FIG. 4 shows an inner diameter of the bore 20 proximal to the exit port 32 of the bore 20. It is possible to adjust the degree of taper and size of the entry port 28 and exit port 32 to the application at hand and the composition of the material to be processed by the present invention.

Referring back to FIGS. 1 and 2, the method of using the preferred embodiment of the molding machine 10 of the present invention is shown. In FIG. 1, a dry blend mixture 24 of base material 34, such as polymer, and reinforcing material 36, such as carbon fiber, is introduced into the plunger housing 12 via a feed port 22 with the assistance of a non-destructive auger 38 that gently feeds the material 24 in a downward direction. The nature of this sample composition is and of a dry and feathery consistency. Due to the low bulk density of this sample composition 24, an auger 38 is needed; however, a heavier composition may be gravity feedable and may not need an auger. A hopper (not shown) may also be provided to further assist in the feeding of the material 24. The plunger housing 12 and barrel housing 18 is heated or pre-heated prior to the start of mixture feeding process with heater bands (not shown), or the like. As shown in FIG. 1, the mixture 24 is fed into the plunger housing 12 and begins to meld and flow toward the exit port of the bore 20 of the barrel housing 18. Due to heat applied to the plunger housing 12 and barrel housing 18, the mixture 24, particularly the polymer component 34 of the mixture, begins to melt.

Turning now to FIG. 2, filling and pre-packing the bore 20, in preparation for extrusion, is shown. Preferably, a volume of melted or partially melted 40 composite material, with reinforcing members 36 loaded therein is packed into the bore 20 by blocking the exit port 32 of the bore 20. The plunger 14 is actuated forward to urge melted or partially melted composite material 40 from the plunger housing 12 into the barrel housing 18. Retraction of the plunger 14 permits the further loading of dry material 24 via the feed port 22. Actuation forward and back of the plunger 14 is preferably carried out to remove all air pockets in the bore 20 and to ensure smooth flow of material 40. It is preferred that the stroke length of the plunger 14 be from just rear of the feed port 22 to a location just prior to the entry port 28.

In accordance with the present invention, as melted or partially melted material 40 travels down the bore 20 toward the exit port 32, the polymer 34 is gradually heated to become fully melted. Due to the smooth taper of the bore 20, loaded reinforcing media 36, such as carbon fibers are naturally aligned with the downward flow of melt material 40 along the length of the bore 20. In FIG. 3, at a location proximal to the entry port 28 of the bore 20, the fibers 36 in the composition 40 are somewhat randomly oriented with the base matrix of polymer 34. However, in accordance with the present invention, the fibers 36 become highly oriented further down the bore 20, namely proximal to the exit port 32 of the bore 20. As a result, the smooth taper of the bore 20 effective orients the fiber 36 within the composition 40. In addition, the overall length of the bore 20 enables the mixture 40 to be properly mixed without using turbulent mixers of the prior art which would damage the delicate carbon fibers 36. The gradual inward taper of the bore 20 gently increases compression without creating additional turbulence with less friction.

Once the bore 20 is pre-packed, flow of the composition 40, with the highly oriented fiber 36 therein, can be started. The exit port 32 is opened and the appropriate molding assembly 26 is connected to the machine for the injection of the composite 40 material therein. At the exit port 32, the composition 40 will be free of clumps of polymer 34 and will be fully wetted out with fibers 36 aligned and evenly distributed therein. Further dry mixture 34 (prior to melting) may be fed through the feed port 22 and, with the assistance of the auger 38, routed into the plunger housing 12 and into the bore 20 for extrusion via the exit port 32. The plunger 14 actuates back and forth to maintain a constant flow of melting mixture 40 through the bore 20 to provide the extrudate out of the exit port 32.

Below is an example of an article formed by the molding machine 10 and corresponding method of the present invention. In this example, the molded article is a plastic heat sink where carbon fibers therein provide the article with high thermal conductivity, particularly in the direction of the length-wise orientation of the carbon fibers. The following table also provides a comparison with a prior art process employing a known screw machine to illustrate the advantages of the present invention.

|  | Present Invention | Prior Art |
|---|---|---|
| Base Matrix | Polymer Resin<br>Polyetherimide (ULTEM)<br>Liquid Crystal Polymer<br>(XYDAR)<br>others | Polymer Resin<br>Polyetherimide (ULTEM)<br>Liquid Crystal Polymer<br>(XYDAR)<br>others |
| Reinforced Media | Carbon Fiber<br>BP Amoco ThermaGraph ™<br>CKDX pitch-based ultrahigh<br>modulus graphite fiber<br>Fiber Length: 0.25–2.0 inches<br>Fiber Diameter: 10 microns | Carbon Fiber<br>BP Amoco ThermaGraph ™<br>CKDX pitch-based ultrahigh<br>modulus graphite fiber<br>Fiber Length: 0.25–2.0 inches<br>Fiber Diameter: 10 microns |
| Loading of<br>Reinforced Media | 10–80 weight % | 10–80 weight % |
| Machine Used | Smooth Tapered Bore<br>Bore Length: 12 inches<br>Entry Port Size: 2 inches<br>Exit Port Size: 0.25 inches | Reciprocating Screw Injection<br>Molding Machine |
| Barrel Melt<br>Temperature | Polymer Dependent: 450–700° F.<br>(for liquid crystalling polyester) | Polymer Dependent: 450–700° F.<br>(for liquid crystalling polyester) |
| Fiber Length in Molded<br>Part | 0.040–0.200 inches or greater | 0.015–0.040 inches |
| Thermal Conductivity | 120 Watts/m-° K. | 28 Watts/m-° K. |

Figure 5:
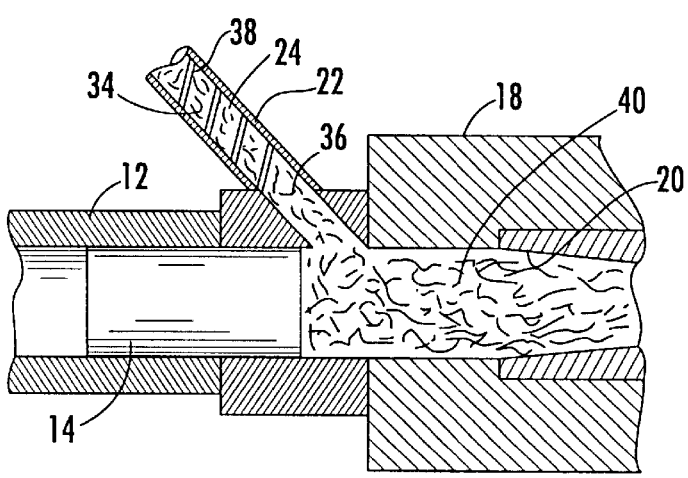
FIG. 5 is an alternative embodiment of the present invention with angle feed port.

Referring now to FIGS. 5–8, a number of alternative embodiments of the present invention are shown. In FIG. 5, an alternative configuration of the feed port 22 is shown to be angled relative to the longitudinal axis of the bore 20 of the barrel housing 18. In the preferred embodiment above, the dry mixture 24 of polymer 34 and carbon fiber 36 is routed through the feed port 22 and into the plunger housing 12 necessitating a 90 degree turn in direction. The alternative embodiment of FIG. 5 lessens the severity of the angle of entry of the polymer 34 with delicate reinforcing fibers 36 therein by "pre-aligning" the fibers 36. As a result, the initial flow of the mixture 24 is less turbulent with less trauma to the fibers 36 causing less breakage of fibers 36 in the mixture. In addition, the auger 38 feed thread size can be made even larger to further avoid breakage of the fibers 36.

Figure 6:
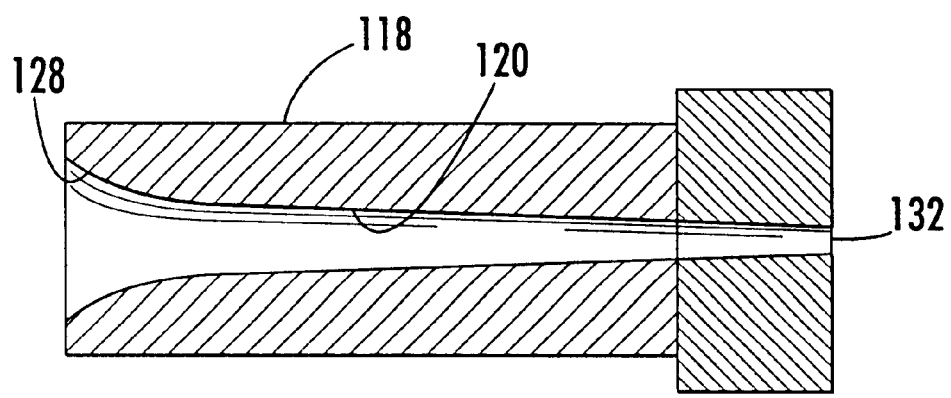
FIG. 6 is a first alternative bore configuration of the molding machine of the present invention.
Figure 7:
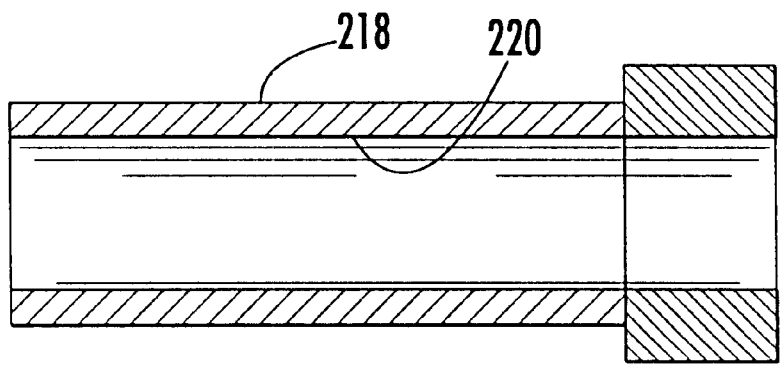
FIG. 7 is a second alternative bore configuration of the molding machine of the present invention.

FIGS. 6 and 7 illustrate bore configurations as alternatives to the continuously inwardly tapered bore 20 of the preferred embodiment shown in FIGS. 1 and 2. FIG. 6 shows a tapered bore 120 in a barrel housing 118 where the entry port 128 of the bore 120 is more tapered that the exit port 132 of bore 120. In this embodiment, the angle of taper is less and less extending from the entry port 128 to the exit port 132 of the bore 120. In this configuration, a more severe wall transition is provided to reduce the volume of composite material within the bore 120. Also, FIG. 7 provides for another smoothly bore configuration where the inner wall of the bore 220 in barrel housing 218 has no taper at all. The bore, in FIG. 7, is cylindrically shaped and is well suited for optimum alignment of the fibers 36 within the composition with little breakage; however, mixing is not as effective as the tapered bores 20 and 120 discussed above. Any one of the foregoing bore geometries 20, 120, 220, or a combination thereof, may be used to accommodate the application at hand to provide the appropriate volume and taper according the particular composition. These geometries may be adjusted to avoid pack out of the bore and ensure consistent flow down the bore.

Figure 8:
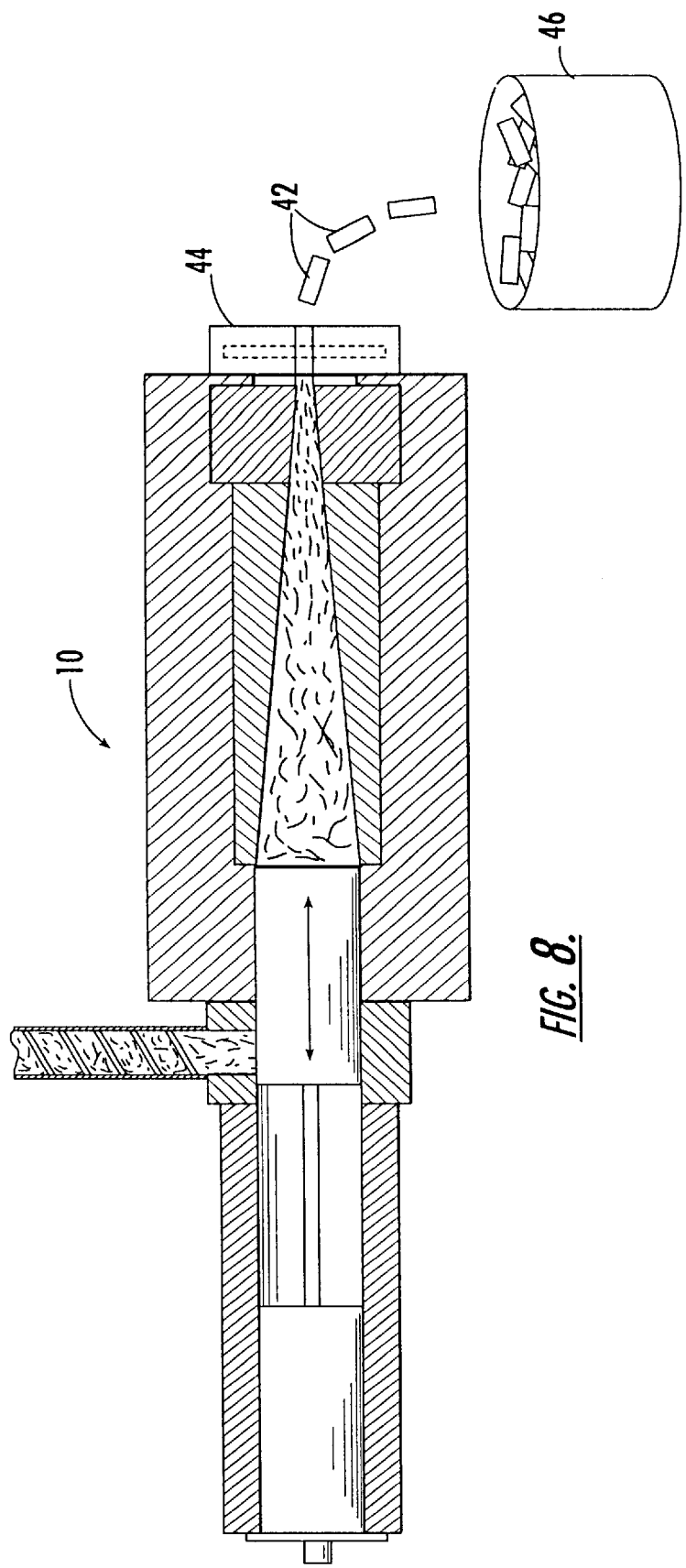
FIG. 8 is a cross-sectional view of the preferred embodiment of the molding machine of the present invention being used as a pelletizer.

It has been described above that the molding machine 10 extrudes a melted composition 40 for injection into a cavity of a mold 26 for forming a reinforced part or article. Appropriate nozzles (not shown) are attached to achieve this transition. As shown in FIG. 8, the molding machine 10 and method can be employed as a pelletizer to form composite pellets 42 for later use in a molding machine. In FIG. 8, a mechanical cutter 44, such as a radial cutter, is employed to cut extruded material into discrete pellets 42 and for ejection into a collection bin 46. The cutter 44 may be driven by rack and pinion linkage, gears and other mechanical assemblies and would be fully adjustable to control the length of the pellet 42 and synchronization with the plunger 14, if required. Each of the pellets 42 include fiber strands therein (not shown) running along the length of the pellet 42 thus maintaining the integrity of the fiber 36 with each pellet 42. This pelletizing process of the present invention is greatly superior to prior art pultrusion methods. The pellets 42 are later melted and formed into a molded part using an injection molding machine such as the one described above in accordance with the present invention.

It would be appreciated by those skilled in the art that various changes and modifications can be made to the illustrated embodiments without departing from the spirit of the present invention. All such modifications and changes are intended to be covered by the appended claims.

What is claimed is:

1. A method of molding polymer reinforced with particles each having a length greater than its width, comprising the steps of:

providing a barrel housing having a first end and a second end opposed to said first end; said barrel assembly including a barrel bore, with a longitudinal axis, extending from said first end to said second end;

providing a plunger housing having a plunger bore extending therethrough and in communication with said first end of said barrel bore;

providing a plunger within with said plunger bore reciprocatable within said plunger bore and into said barrel bore via said first end;

providing a feed port through said plunger housing and into communication with said plunger bore;

providing a mixture of dry polymer and reinforcing particles a plurality of said particles having a length greater that their width;

heating said plunger housing;

heating said barrel housing;

retracting said plunger within said plunger housing forming an initial melt chamber;

feeding said mixture through said feed port and into said initial melt chamber;

partially melting said polymer of said mixture;

pushing said plunger through said initial melt chamber;

urging said mixture into said barrel housing;

fully melting said polymer of said mixture in said barrel housing;

positioning said particles in said mixture, in said barrel housing, with said length of said particles being substantially aligned with the longitudinal axis of said barrel bore; and extruding said mixture in melted form said second end of said barrel housing with said particles being substantially aligned with the longitudinal axis of said barrel bore.

2. The method of claim 1, further comprising the step of:

providing an auger to said feed port to assist in the feeding of said mixture through said feed port and into said initial melt chamber.

3. The method of claim 1, further comprising the step of:

providing a barrel bore with a continuously inwardly tapered barrel bore extending from said first end to said second end where said first end has an opening relatively larger than an opening at said second end.

4. The method of claim 1, further comprising the step of:

providing a barrel bore with a parallel barrel bore extending from said first end to said second end where said first end has an opening substantially equal to an opening at said second end.

5. The method of claim 1, further comprising the step of:

providing a barrel bore with a decreasing inwardly tapered barrel bore extending from said first end to said second end where said first end has an opening relatively larger than an opening at said second end.

6. The method of claim 1, further comprising the step of:

positioning said auger feed at an angle less than 90 degrees relative to said plunger housing.

* * * * *